United States Patent
Yang et al.

(10) Patent No.: US 12,238,462 B2
(45) Date of Patent: Feb. 25, 2025

(54) PROJECTION POSITION GUIDING METHOD

(71) Applicant: Coretronic Corporation, Hsin-Chu (TW)

(72) Inventors: Chung-Lung Yang, Hsin-Chu (TW); Chien-Chun Peng, Hsin-Chu (TW); Hsun-Cheng Tu, Hsin-Chu (TW); Kang-Shun Hsu, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 18/151,476

(22) Filed: Jan. 9, 2023

(65) Prior Publication Data

US 2023/0224443 A1    Jul. 13, 2023

(30) Foreign Application Priority Data

Jan. 10, 2022    (CN) .......................... 202210022225.1

(51) Int. Cl.
  *H04N 9/31*    (2006.01)
(52) U.S. Cl.
  CPC ......... *H04N 9/3185* (2013.01); *H04N 9/3182* (2013.01)
(58) Field of Classification Search
  CPC .. H04N 9/3185; H04N 9/3188; H04N 9/3147; H04N 9/3182; H04N 9/317;
  (Continued)

(56) References Cited

U.S. PATENT DOCUMENTS

2005/0168705 A1    8/2005  Li et al.
2008/0100805 A1*   5/2008  Majumder ............ G06F 3/1446
                                                    353/30

(Continued)

FOREIGN PATENT DOCUMENTS

CN          113497923       10/2021
JP          2015166893       9/2015

(Continued)

OTHER PUBLICATIONS

"Partial Search Report of Europe Counterpart Application", issued on Apr. 6, 2023, p. 1-p. 18.

(Continued)

*Primary Examiner* — John W Miller
*Assistant Examiner* — Humam M Satti
(74) *Attorney, Agent, or Firm* — JCIPRNET (57) ABSTRACT

A projection position guiding method adapted to a projection system is provided. The projection system includes a projection target, an image capturing device and a projector. The projection position guiding method includes: projecting a projection content onto the projection target by the projector to generate a projection image, the projection content includes multiple positioning grid points arranged at intervals; capturing the projection target by the image capturing device to generate a captured image, and the captured image includes at least part of the projection image; and determining whether the positioning grid points satisfy multiple recognizable conditions according to the projection image in the captured image, when it is determined that the positioning grid points include at least one unrecognizable grid point that does not satisfy at least one of the recognizable conditions, adjusting a color of the at least one unrecognizable grid point in the projection content.

17 Claims, 9 Drawing Sheets

(58) Field of Classification Search
CPC .. H04N 9/3194; H04N 9/3141; H04N 9/3179; G06T 3/08
See application file for complete search history.

(56) References Cited

U.S. PATENT DOCUMENTS

| | | |
|---|---|---|
| 2013/0141593 A1 | 6/2013 | Bassi et al. |
| 2015/0146990 A1 | 5/2015 | Uchiyama et al. |
| 2015/0208050 A1 | 7/2015 | Pawlak et al. |
| 2015/0213584 A1 | 7/2015 | Ishikawa et al. |
| 2016/0353068 A1 | 12/2016 | Ishikawa et al. |
| 2020/0092524 A1* | 3/2020 | Morris ............... G01B 11/2513 |
| 2020/0213565 A1* | 7/2020 | Peng .................... H04N 9/3185 |
| 2021/0127096 A1* | 4/2021 | Lin ...................... H04N 9/3194 |
| 2021/0297643 A1 | 9/2021 | Peng et al. |
| 2022/0141430 A1* | 5/2022 | Tseng .................. H04N 9/3194 |
| | | 353/94 |
| 2023/0031450 A1* | 2/2023 | Imamura ............. G03B 21/142 |

FOREIGN PATENT DOCUMENTS

| | | | |
|---|---|---|---|
| TW | I695626 | 6/2020 | |
| WO | WO-2018094513 A1 * | 5/2018 | ............. G06F 3/011 |

OTHER PUBLICATIONS

"Search Report of Europe Counterpart Application", issued on Jul. 25, 2023, p. 1-p. 25.

* cited by examiner

PROJECTION POSITION GUIDING METHOD

CROSS-REFERENCE TO RELATED APPLICATION

This application claims the priority benefit of China application serial no. 202210022225.1, filed on Jan. 10, 2022. The entirety of the above-mentioned patent application is hereby incorporated by reference herein and made a part of this specification.

BACKGROUND OF THE DISCLOSURE

Field of the Disclosure

The present disclosure relates to a projection position guiding method, and more particularly, to a projection position guiding method for a projector cooperating with an image capturing device.

Description of Related Art

A conventional projector can be used with an image capturing device to automatically adjust the projection image during an image adjusting process, such as auto blending or auto focusing. Generally speaking, the user needs to adjust the position and direction of the image capturing device or the projector so that the entire projection image can be captured, and then an external computing device such as a computer is utilized to determine how to adjust the position and direction of the projector and the image capturing device based on the captured image. However, the projector and the image capturing device need to be connected to an additional computer in a wired manner. When the projector or the image capturing device is configured to be disposed at a high position, it is not easy to set up the connection between the projector and the external computing device. In addition, when recognizable conditions for the captured image are insufficient, for example, the pixel resolution of the grid points of the captured image is too low, the accuracy in determining the adjustment would be reduced.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the disclosure was acknowledged by a person of ordinary skill in the art.

SUMMARY OF THE DISCLOSURE

The present disclosure provides a projection system and an image projection method, which can adjust the projection image on the projection target according to the direction instruction in the captured image, so as to guide the user to adjust the position and direction of the image capturing device or the projector.

Other objects and advantages of the disclosure can be further understood from the technical features disclosed in the present disclosure. To achieve one or part or all of the above purposes or other purposes, an embodiment of the present disclosure provides a projection position guiding method, which is adaptable for a projection system including a projection target, an image capturing device and a projector. The projection position guiding method includes: projecting projection content to a projection target through a projector to generate a projection image, and the projection content includes a plurality of positioning grid points arranged at intervals. The projection target is captured by the image capturing device to generate a captured image, and the captured image includes at least part of the projection image. It is determined whether the plurality of positioning grid points satisfy a plurality of recognizable conditions according to the projection image in the captured image. When it is determined that the plurality of positioning grid points include at least one unrecognizable grid point that does not satisfy at least one of the plurality of recognizable conditions, the color of the at least one unrecognizable grid point in the projection content is adjusted.

Another embodiment of the present disclosure provides a projection position guiding method, which is adaptable for a projection system. The projection system includes a projection target, a plurality of image capturing devices, and a plurality of projectors. The projection position guiding method includes: projecting projection content to a projection target through each of a plurality of projectors to generate a projection image, and the projection content includes a plurality of positioning grid points arranged at intervals; capturing the projection target by the corresponding image capturing device to generate a captured image, and the captured image includes at least part of the projection image; determining whether the plurality of positioning grid points satisfy a plurality of recognizable conditions according to the projection image in the captured image; and when it is determined that the plurality of positioning grid points include at least one unrecognizable grid point that does not satisfy at least one of the plurality of recognizable conditions, adjusting the color of the at least one unrecognizable grid point in the projection content.

Based on the above, the embodiments of the present disclosure have at least one of the following advantages or effects. In the projection position guiding method described in the embodiments of the present disclosure, when it is determined that at least one of the multiple projected positioning grid points does not meet the recognizable conditions, the color of at least one unrecognizable grid point in the projection content is adjusted to serve as an instruction obtained from the projection image for the user to adjust the position and direction of the image capturing device or projector, and no additional external device is required to provide the instruction for adjustment. In addition, the position of unrecognizable grid points can be clearly displayed to narrow the range of environmental adjustment.

Other objectives, features and advantages of the present disclosure will be further understood from the further technological features disclosed by the embodiments of the present disclosure wherein there are shown and described preferred embodiments of this disclosure, simply by way of illustration of modes best suited to carry out the disclosure.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF EMBODIMENTS

It is to be understood that other embodiment may be utilized and structural changes may be made without departing from the scope of the present disclosure. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings.

Figure 1:
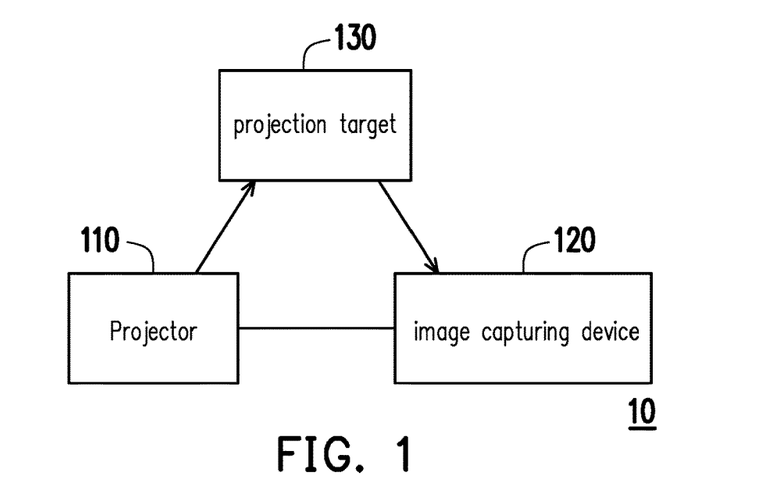
FIG. 1 is a schematic view of a projection system according to an embodiment of the present disclosure.

FIG. 1 is a schematic view of a projection system according to an embodiment of the present disclosure. Referring to FIG. 1, the projection system 10 of this embodiment includes a projector 110, an image capturing device 120 and a projection target 130. The projector 110 projects the projection content onto the projection target 130 to generate a projection image, and the image capturing device 120 captures the projection target 130 to generate a captured image. The captured image includes at least a part of the projection image. The image capturing device 120 is coupled to the projector 110, and the image capturing device 120 is configured to provide the captured image to the projector 110. The projector 110 may include a processor (not shown) for performing data processing such as making judgment and adjustment described in the disclosure. The projection target 130 is, for example, a projection screen or a wall. The image capturing device 120 is an external device disposed outside the projector 110. In the other embodiment, the image capturing device 120 is a device disposed inside the projector 110 or disposed on the projector 110.

Figure 2:
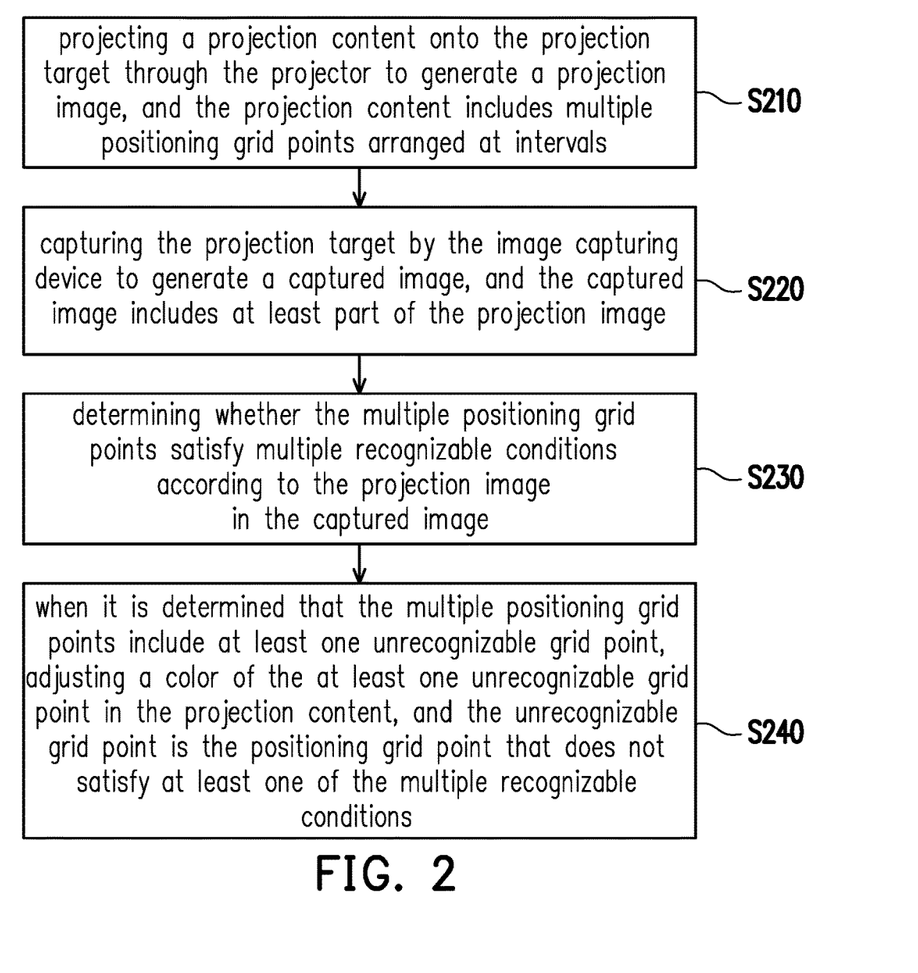
FIG. 2 is a flowchart illustrating a projection position guiding method according to an embodiment of the present disclosure.
Figure 3:
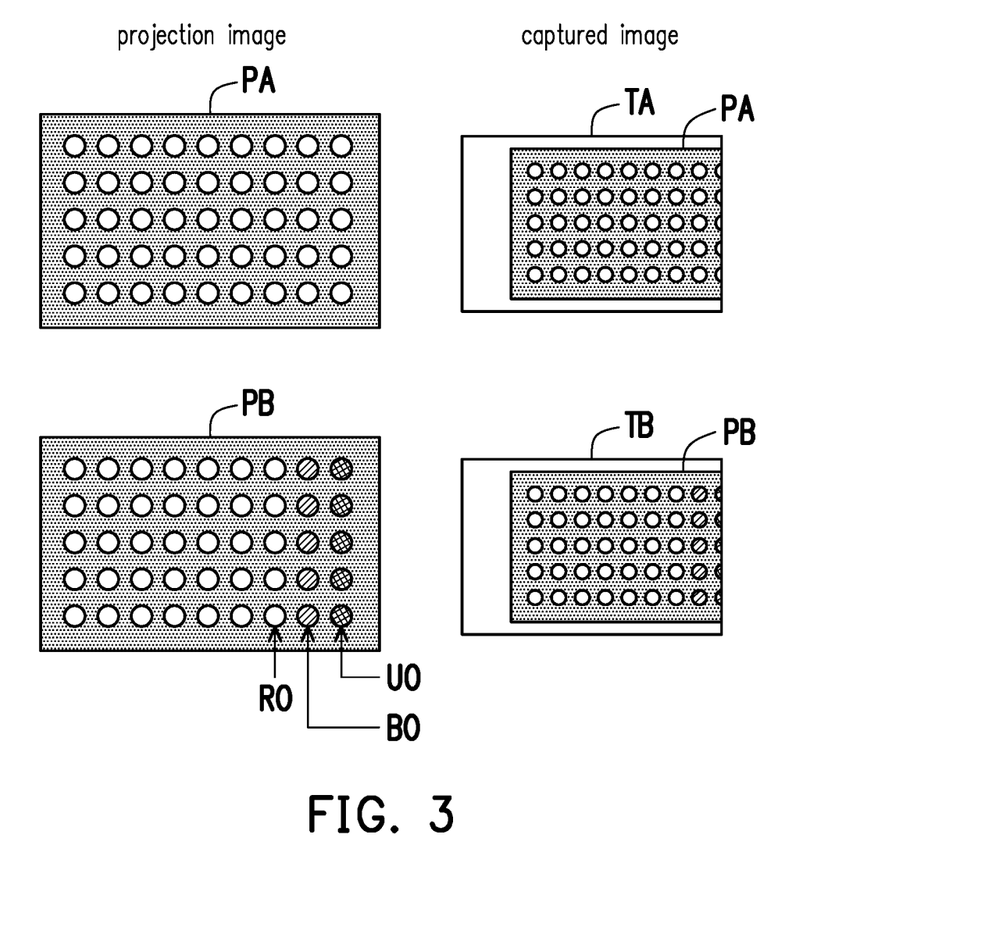
FIG. 3 is a schematic view illustrating a projection image and a captured image according to an embodiment of the present disclosure.

FIG. 2 is a flowchart illustrating a projection position guiding method according to an embodiment of the present disclosure. FIG. 3 is a schematic view illustrating a projection image and a captured image according to an embodiment of the present disclosure. Please refer to FIG. 2 and FIG. 3. In step S210, the projection system 10 projects the projection content onto the projection target 130 through the projector 110 to generate the projection image PA. The projection content includes a plurality of positioning grid points arranged at intervals, and the plurality of positioning grid points are multiple circular grid points in the projection image PA. The projection content is the image information that the projector 110 receives from the external image source or the image information which is stored in the projector 110. In the projection content, each positioning grid point of the plurality of positioning grid points has the same size and is arranged at a distance with fixed interval. The plurality of positioning grid points are arranged in an array. Taking FIG. 1 and FIG. 3 as an example, the projection content is projected by the projector 110 onto the projection target 130 to generate the projection image PA. The positioning grid points are used to define the position of the projection image in the captured image. For example, in FIG. 3, the projection image PA is located toward the right side of the captured image TA, and the projection image PB is located toward the right side of the captured image TB. In the other embodiment, each of the plurality of positioning grid points may be a square or a rectangular point in the projection content.

Next, in step S220, the projection system 10 captures the projection target 130 through the image capturing device 120 to generate a captured image, and the captured image includes at least part of the projection image. Taking FIG. 3 as an example, the captured image TA may include part of the projection image PA.

In step S230, the projection system 10 determines whether the plurality of positioning grid points satisfy a plurality of recognizable conditions according to the projection image in the captured image. Specifically, when the positioning grid points meet multiple recognizable conditions, such positioning grid points are determined to be recognizable grid points. When the positioning grid points do not meet at least one of the multiple recognizable conditions, such positioning grid points are determined to include at least one unrecognizable grid point. In an embodiment, the plurality of recognizable conditions may include five recognizable conditions. The first recognizable condition is that the resolution of the projection image in the captured image is greater than the minimum resolution. The second recognizable condition is that a spacing of any two adjacent positioning grid points is greater than a minimum spacing of two adjacent positioning grid points. The third recognizable condition is that the difference in the diameters of the largest positioning grid point and the smallest positioning grid point is less than the distortion amount of the largest positioning grid point. The fourth recognizable condition is that the gray-scale contrast is greater than the minimum gray-scale contrast. The fifth recognizable condition is that all the positioning grid points are captured and shown in the captured image.

For example, regarding the first recognizable condition, if the minimum resolution is 300 by 225 pixels, when the resolution of the captured image which includes at least part of the multiple positioning grid points is greater than 300 by 225 pixels, it is determined that the first recognizable condition is satisfied. When the resolution of the captured image is less than 300 by 225 pixels, it is determined that the first recognizable condition is not satisfied. Regarding the second recognizable condition, if the minimum spacing between two adjacent positioning grid points in the captured image is 5 cm, then when the spacing between any two adjacent positioning grid points is greater than 5 cm (the minimum spacing), it is determined that the second recognizable condition is satisfied. When the spacing of the two adjacent positioning grid points is less than 5 cm (the minimum spacing), it is determined that the second recognizable condition is not satisfied. In an embodiment, the minimum spacing of the two adjacent positioning grid points may be equivalent to the radius of each of the two adjacent positioning grid point, but is not limited thereto. Regarding the third recognizable condition, if the distortion amount of the largest positioning grid point is 1.5 cm, then when the difference in the diameters of the largest positioning grid point and the smallest positioning grid point is less than 1.5 cm, it is determined that the third recognizable condition is satisfied. When the difference in the diameters of the largest positioning grid point and the smallest positioning grid point is greater than 1.5 cm, it is determined that the third recognizable condition is not satisfied. For example, the diameter of the largest positioning grid point among the multiple positioning grid points is 10 cm and the diameter of the smallest positioning grid point is 9 cm, then the diameter difference between the largest positioning grid point and the smallest positioning grid point is 1 cm, which is less than the distortion amount of the largest positioning grid point 1.5 cm. That is, the third recognizable condition is satisfied. The diameter of the largest positioning grid point in the multiple positioning grid points is 10 cm and the diameter of the smallest positioning grid point is 8 cm, then the diameter difference between the largest positioning grid point and the smallest positioning grid point is 2 cm, which is greater than the distortion amount of the largest positioning grid point 1.5 cm. That is, the third recognizable condition is not satisfied. In an embodiment, the distortion amount of the largest positioning grid point may be 15% of the diameter of the largest positioning grid point, but is not limited thereto. Regarding the fourth recognizable condition, when the gray-scale contrast between the positioning grid points and the region without the positioning grid points in the captured image is greater than the minimum gray-scale contrast, it is determined that the fourth recognizable condition is satisfied. When the gray-scale contrast between the positioning grid points and the region without positioning grid points in the captured image is less than the minimum gray-scale contrast, it is determined that the fourth recognizable condition is not satisfied. Regarding the fifth recognizable condition, when all the positioning grid points are completely captured based on the comparison between the projection image in the captured image and the projection content, it is determined that the positioning grid points satisfy the fifth recognizable condition. When at least one of the positioning grid points is not captured based on the comparison between the projection image in the captured image and the projection content, it is determined that the fifth recognizable condition is not satisfied. For example, the positioning grid points in the rightmost column of the captured image TA or TB in FIG. 3 are not completely captured. Then the fifth recognizable condition is not satisfied. When the positioning grid points do not satisfy at least one of the recognizable conditions, such positioning grid points are determined to include at least one unrecognizable grid point. In step S240, when the projection system 10 determines that the plurality of positioning grid points include at least one unrecognizable grid point, a color of at least one unrecognizable grid point in the projection content is adjusted. The unrecognizable grid point is the positioning grid point that does not satisfy at least one of the multiple recognizable conditions. For example, please refer to FIG. 3, since the positioning grid points in the rightmost column of captured image TA are not completely captured, and do not satisfy the fifth recognizable condition, the projection system 10 determines that the positioning grid points in the rightmost column of the projection image PA are unrecognizable grid points (also referred to as incompletely captured grid points), and the rest of the positioning grid points in the projection image PA are recognizable grid points. The color of the unrecognizable grid points in the projection content is adjusted. The adjusted projection image PB includes the unrecognizable grid points U0 and the recognizable grid points R0, and the color of the unrecognizable grid points U0 is different from the color of the recognizable grid points R0.

Please refer to FIG. 3, the projector 110 projects the projection content onto the projection target 130 to generate a projection image PA, and the image capturing device 120 captures the projection image PA to generate a captured image TA. The captured image TA may include at least part of the projection image PA. In this embodiment, since the positioning grid points in the rightmost column of captured image TA are not completely captured and do not satisfy the fifth recognizable condition and are determined as unrecognizable grid points, the projection system 10 may adjust the projection content according to the determination, so that the projection image PA becomes the projection image PB. The projection content in the projection image PB includes a plurality of unrecognizable grid points U0 and a boundary grid point B0 located between the plurality of unrecognizable grid points U0 and a plurality of recognizable grid points R0. The color (the third color) of the boundary grid point B0 is different from the color (the second color) of the unrecognizable grid point U0 and the color (the first color) of the recognizable grid point R0. The projection image PB corresponding to the adjusted projection content is projected to the projection target 130 and then captured by the image capturing device 120 as the captured image TB. The colors of the positioning grid points in the captured image TB correspond to the colors of the positioning grid points in the projection image PB. In this embodiment, the captured image TB includes part of the projection image PB. The projection system 10 may set the color (fourth color) of the border of the projection image PB in the captured image TB for recognizing the border of the projection image PB in the captured image TB. The unrecognizable grid point U0 and the boundary grid point B0 may be used as a plurality of indicating grid points, so as to provide information for adjusting the position and direction of the projector 110 or the image capturing device 120 or adjusting the projection environment. For instance, the direction of the image capturing device 120 or the projection angle of the projector 110 relative to the projection target 130 is correspondingly moved according to the positions of the boundary grid points B0 of the projection image PB in the captured image TB, such that the captured image is able to show the entire and complete projection image.

Figure 4A:
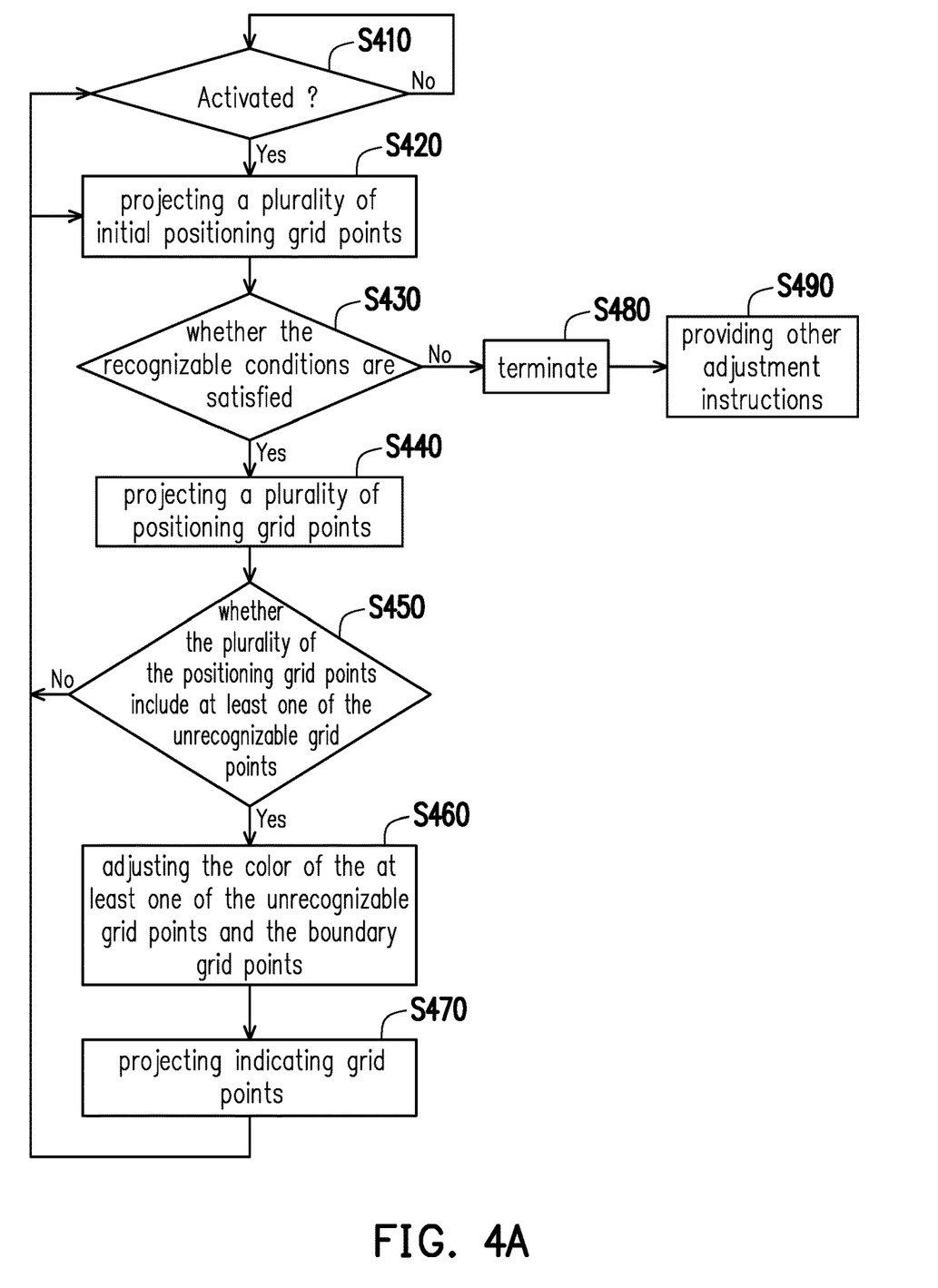
FIG. 4A is a schematic view illustrating a projection position guiding method according to an embodiment of the present disclosure.
Figure 4B:
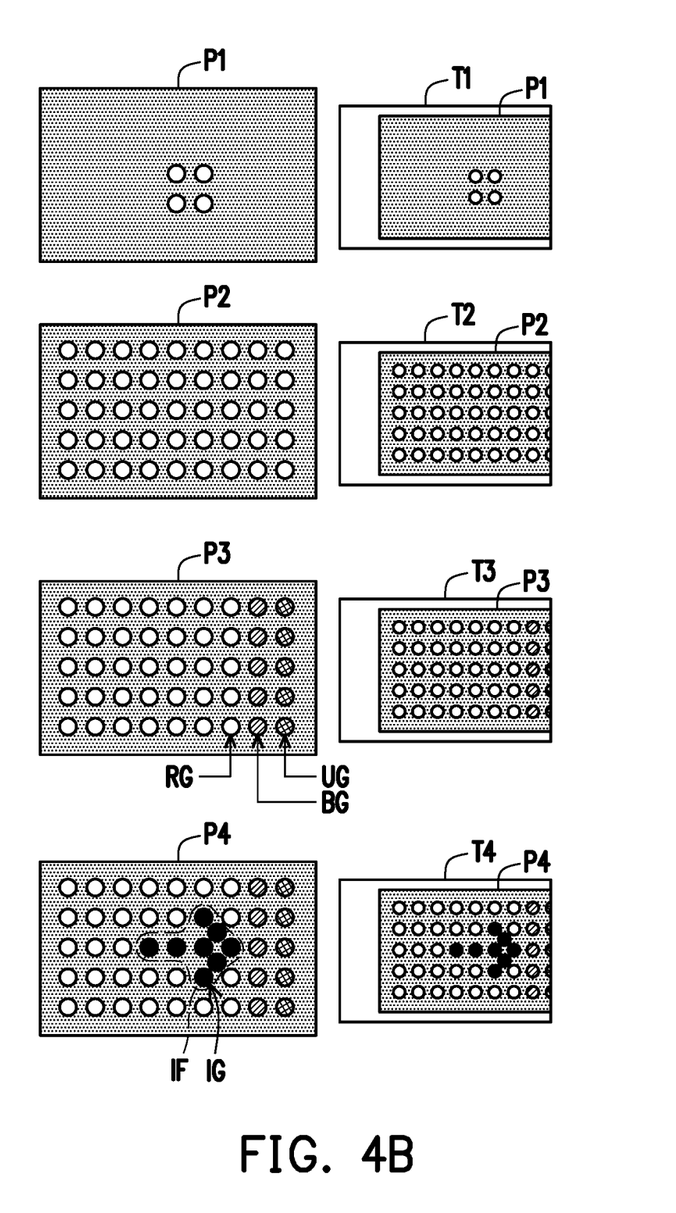
FIG. 4B is a schematic view of a projection position guiding method corresponding to FIG. 4A according to an embodiment of the present disclosure.

FIG. 4A is a schematic view illustrating a projection position guiding method according to an embodiment of the present disclosure. FIG. 4B is a schematic view of a projection position guiding method corresponding to FIG. 4A according to an embodiment of the present disclosure. Referring to FIG. 4A and FIG. 4B, in step S410, the projection system 10 determines whether the projection position guiding function is activated, and if so, proceeds to step S420, otherwise step S410 is repeated. In step S420, the projector 110 projects the initial projection content onto the projection target 130 to generate an initial projection image P1. The initial projection content shown in the projection image P1 includes a plurality of initial positioning grid points arranged at intervals. It should be noted that FIG. 4A and FIG. 4B are only examples, and the actual number and arrangement of the initial positioning grid points are determined based on actual design requirements, and are not limited thereto. The image capturing device 120 captures the projection target 130 to generate the initial captured image T1, and the initial captured image T1 includes at least part of the initial projection image P1.

Next, in step S430, the projection system 10 determines whether the plurality of initial positioning grid points satisfy a plurality of recognizable conditions according to the initial projection image P1 in the initial captured image T1. The recognizable conditions are as described above and will not be repeated here. When the plurality of initial positioning grid points satisfy the plurality of recognizable conditions, the process goes to step S440, and when the plurality of initial positioning grid points do not satisfy at least one of the plurality of recognizable conditions, the process goes to step S480. In step S480, the projection system 10 stops the projection position guiding function. For example, the projector 110 stops projecting the initial positioning grid point and the image capturing device 120 stop capturing images. In step S490, the projection system 10 provides other adjustment instructions. In this embodiment, text may be displayed on the display screen (projection target) by the projector 110 to provide an environment adjustment method to satisfy the multiple recognizable conditions, such as suggesting the user to improve the poor environment for the projection target 130.

In step S440, the projection system 10 converts the coordinate system of the projector 110 and the coordinate system of the image capturing device 120 to project the projection content onto the projection target 130 to generate a projection image P2, and the projection content P2 includes a plurality of positioning grid points arranged at intervals. Specifically, the projection system 10 may convert the coordinate system of the projector 110 and the coordinate system of the image capturing device 120 according to the positions of the multiple initial positioning grid points in the captured image T1, so as to estimate the positions of the multiple positioning grid points of the projection content P2. It should be noted that the number of positioning grid points in the projection content is greater than the number of initial positioning grid points in the initial projection content, and the number of positioning grid points in the projection image P2 is greater than the number of initial positioning grid points in the projection image P1. The actual number and the arrangement of positioning grid points are determined based on the actual design requirements and are not limited thereto. Next, the image capturing device 120 captures the projection target 130 to generate a captured image T2, and the captured image T2 includes at least part of the projection image P2.

In step S450, the projection system 10 determines whether the positioning grid points in the captured image P2 include at least one unrecognizable grid point. When the projection system 10 determines that the captured image P2 has at least one unrecognizable grid point, the process goes to step S460. When the projection system 10 determines that the captured image 2 does not have any unrecognizable grid point, the process returns to step S410. In this embodiment, after comparing the projection content projected by the projector 110 with the projection image P2 in the captured image T2, it may be determined that the multiple positioning grid points in the captured image T2 are not completely captured and do not satisfy the fifth recognizable condition, that is, it can be determined that the positioning grid points of the captured image T2 includes at least one unrecognizable grid point, so step S460 should be performed.

In step S460, the color of the unrecognizable grid points UG in the projection content is correspondingly changed to be the second color by the projector 110 according to the positions of the unrecognizable grid points in the captured image T2, the color of the boundary grid points BG adjacent to the unrecognizable grid points UG in the projection content is changed to be the third color, and the adjusted projection content is projected onto the projection target 130 and a projection image P3 is generated. The color of the positioning grid points RG excluding the unrecognizable grid points UG and the boundary grid points BG in the projection content is the first color. The first color, the second color, and the third color are different. In this embodiment, the unrecognizable grid points UG are not completely captured in the captured image T3. In this embodiment, the recognizable grid points RG include the boundary grid points BG, and the boundary grid points BG are located adjacent the unrecognizable grid points UG. The indicating grid points are correspondingly generated according to the distribution of the unrecognizable grid points UG and the boundary grid points BG in the projection content. The indicating grid points are information for adjusting the position and direction of the projector 110 or the image capturing device 120 or information for adjusting the projection environment. In the other embodiment, the unrecognizable grid points UG and the boundary grid points BG may serve as indicating grid points. Next, the image capturing device 120 captures the projection target 130 to generate a captured image T3, and the captured image T3 includes at least part of the projection image P3.

In step S470, the projection system 10 generates an instruction image IF for adjusting the projection environment according to the distribution positions of the unrecognizable grid points UG and the boundary grid points BG in the projection content, and projects the instruction image IF onto the projection target 130 to generate the projection image P4. Moreover, the image capturing device 120 captures the projection target 130 to generate a captured image T4. The instruction image IF includes a plurality of indicating grid points IG, and the color (fifth color) of the plurality of indicating grid points IG is different from the color (first color) of the plurality of positioning grid points. The plurality of indicating grid points IG in the instruction image IF are configured to provide information for adjusting the position and direction of the projector 110 or the image capturing device 120 or adjusting the projection environment, and the instruction image IF shows in the projection image P4. Specifically, the instruction image IF may be a direction arrow, such as a direction arrow indicating the right side in the projection content P4, to instruct the image capturing device 120 to rotate toward the right side or move to the right side, or to instruct the projector 110 to rotate toward to the left side or move to the left side, or to instruct the projection target 130 to move to the right side, etc., so as to obtain the captured image including complete projection image. Next, the process returns to step S410.

Figure 5A:
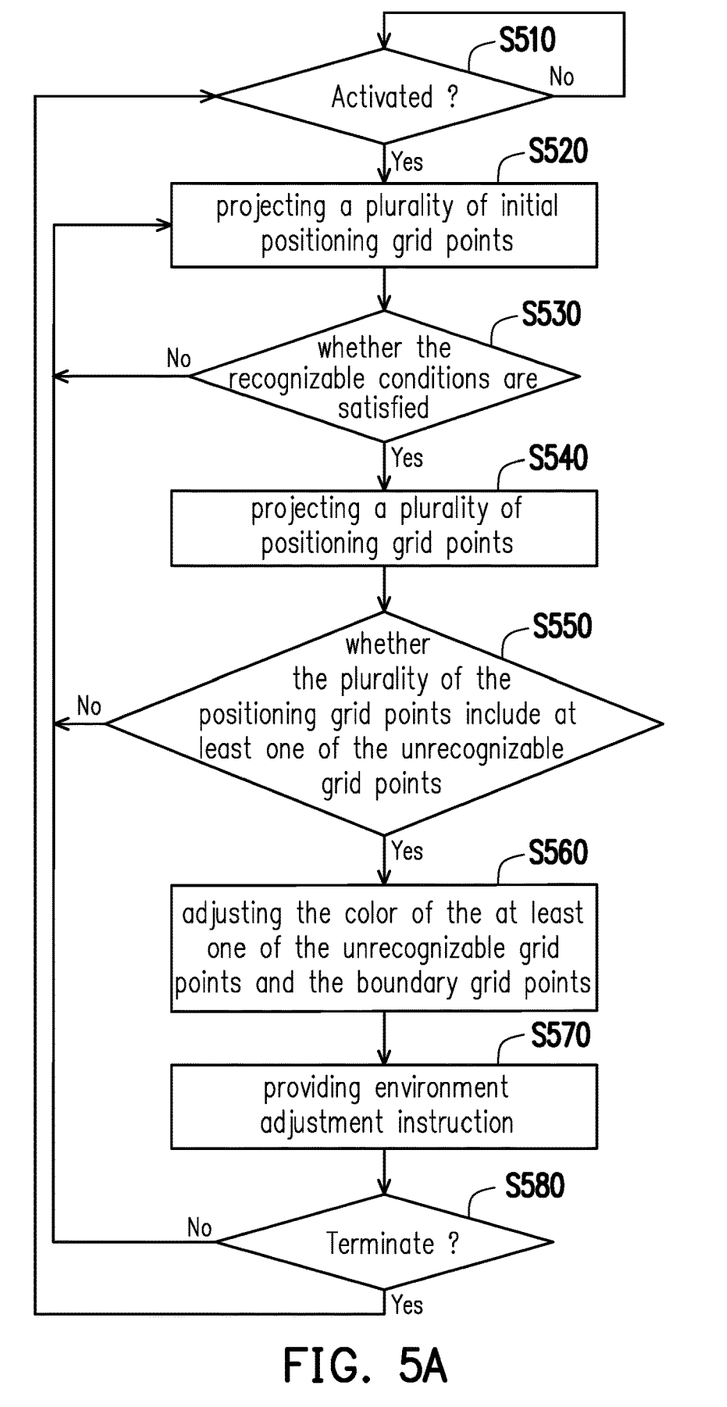
FIG. 5A is a schematic view illustrating a projection position guiding method according to an embodiment of the present disclosure.
Figure 5B:
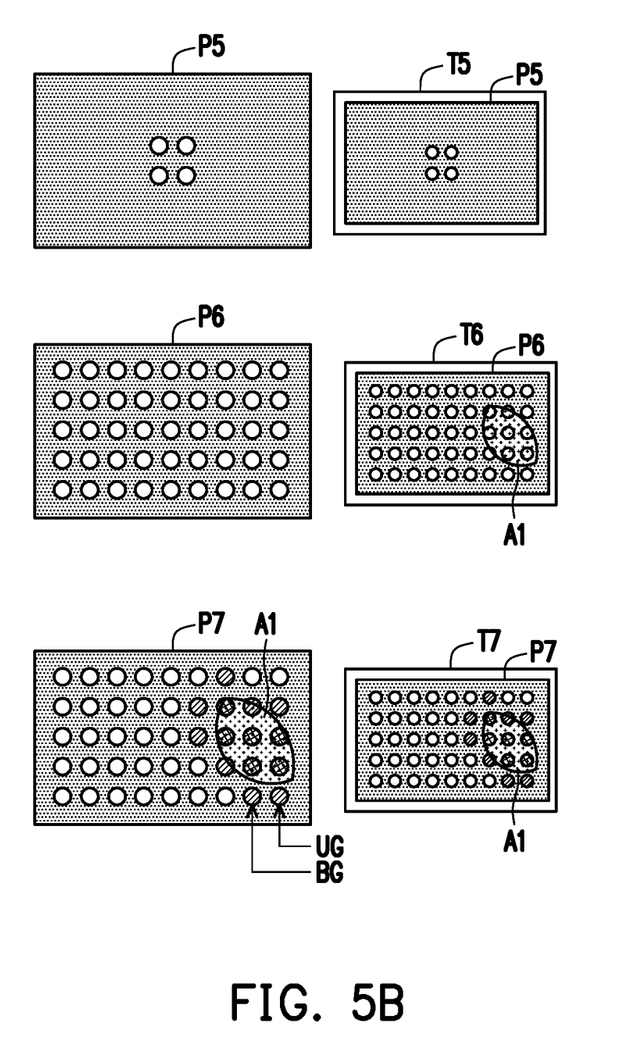
FIG. 5B is a schematic view of a projection position guiding method corresponding to FIG. 5A according to another embodiment of the present disclosure.

FIG. 5A is a schematic view illustrating a projection position guiding method according to an embodiment of the present disclosure. FIG. 5B is a schematic view of a projection position guiding method corresponding to FIG. 5A according to another embodiment of the present disclosure. Referring to FIG. 5A and FIG. 5B, in step S510, the projection system 10 determines whether the projection position guiding function is activated, and if so, proceeds to step S520, otherwise step S510 is repeated. In step S520, the projector 110 projects the initial projection content to the projection target 130 to generate an initial projection image P5. The initial projection content includes a plurality of initial positioning grid points arranged at intervals. The image capturing device 120 captures the projection target 130 to generate an initial captured image T5, and the initial captured image T5 includes the initial projection image P5. Next, in step S530, the projection system 10 determines whether the plurality of initial positioning grid points satisfy a plurality of recognizable conditions according to the initial projection image P5 in the initial captured image T5. The recognizable conditions are as described above and will not be repeated here. When the plurality of initial positioning grid points satisfy the plurality of recognizable conditions, go to step S540, and when the plurality of initial positioning grid points do not satisfy at least one of the plurality of recognizable conditions, go back to step S520.

In step S540, the projection system 10 converts the coordinate system of the projector 110 and the coordinate system of the image capturing device 120 to project the projection content to the projection target 130 to generate a projection image P6. The projection content includes a plurality of positioning grid points arranged at intervals. Specifically, the projection system 10 may convert the coordinate system of the projector 110 and the coordinate system of the image capturing device 120 according to the positions of the initial positioning grid points in the captured image T5, so as to estimate the positions of the plurality of positioning grid points in the projected content. It should be noted that the number of positioning grid points in the projection content is greater than the number of initial positioning grid points in the initial projection content, the number of positioning grid points in the projection image P6 is greater than the number of initial positioning grid points in the initial projection image P5, and the actual number and arrangement of positioning grid points are determined based on the actual design requirements and are not limited thereto. Next, the image capturing device 120 captures the projection target 130 to generate a captured image T6, and the captured image T6 includes the projection image P6.

In step S550, the projection system 10 determines whether the positioning grid points in the captured image T6 includes at least one unrecognizable grid point. When the projection system 10 determines that the captured image T6 has at least one unrecognizable grid point, the process goes to step S560. When the projection system 10 determines that the captured image T6 does not have any unrecognizable grid point, the process returns to step S520. In this embodiment, since the area A1 in the captured image T6 is illuminated by a searchlight, the gray-scale contrast between the positioning grid points and the region without positioning grid points in the area A1 is less than the minimum gray-scale contrast, which does not satisfy the fourth recognizable condition, then it may be determined that the corresponding captured image T6 has unrecognizable grid points, so step S560 should be performed.

In step S560, changes the color of the unrecognizable grid points UG in the projection content is correspondingly changed to be the second color by the projector 110 according to the positions of the unrecognizable grid points in the captured image T6, the color of the boundary grid points BG adjacent to the unrecognizable grid points UG is changed to be the third color, and the adjusted projection content is projected by the projector 110 onto the projection target 130 and a projection image P7 is generated. The color of the recognizable grip points excluding the unrecognizable grid points UG and the boundary grid points BG is the first color, and the first color, the second color and the third color are different. Next, the image capturing device 120 captures the projection target 130 to generate a captured image T7, and the captured image T7 includes the projection image P7.

In step S570, the projection system 10 may provide an environment adjustment instruction. For example, the projection system 10 may provide a text message suggesting the user to turn off the searchlight or reduce the brightness of the searchlight to solve the problem that the gray-scale contrast between the positioning grid points and the region without positioning grid points in the area A1 is less than the minimum gray-scale contrast, resulting in failure to satisfy the recognizable conditions. In step S580, the projection system 10 determines whether to stop the projection position guiding function; if so, go back to step S510, otherwise go back to step S520.

Figure 6A:
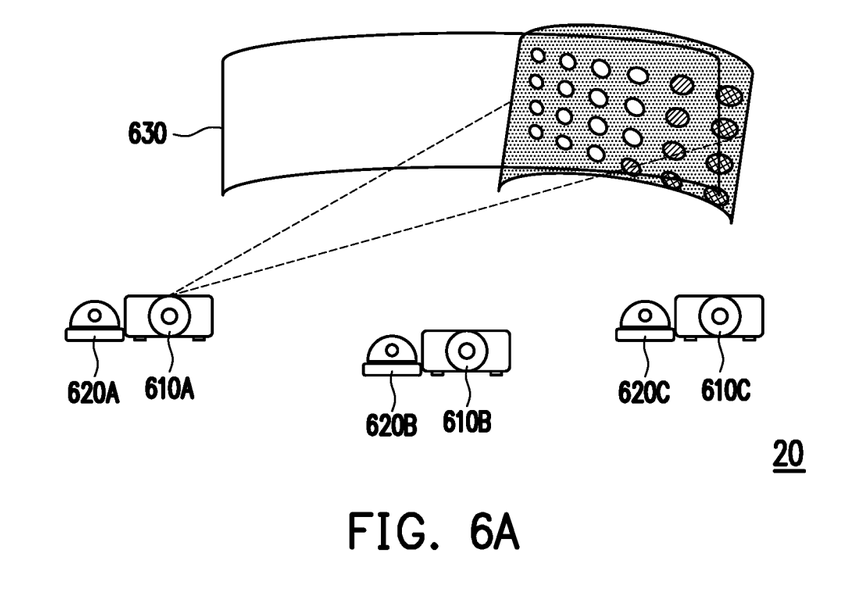
FIG. 6A, FIG. 6B, and FIG. 6C are schematic views illustrating a projection position guiding method according to an embodiment of the present disclosure.
Figure 6B:
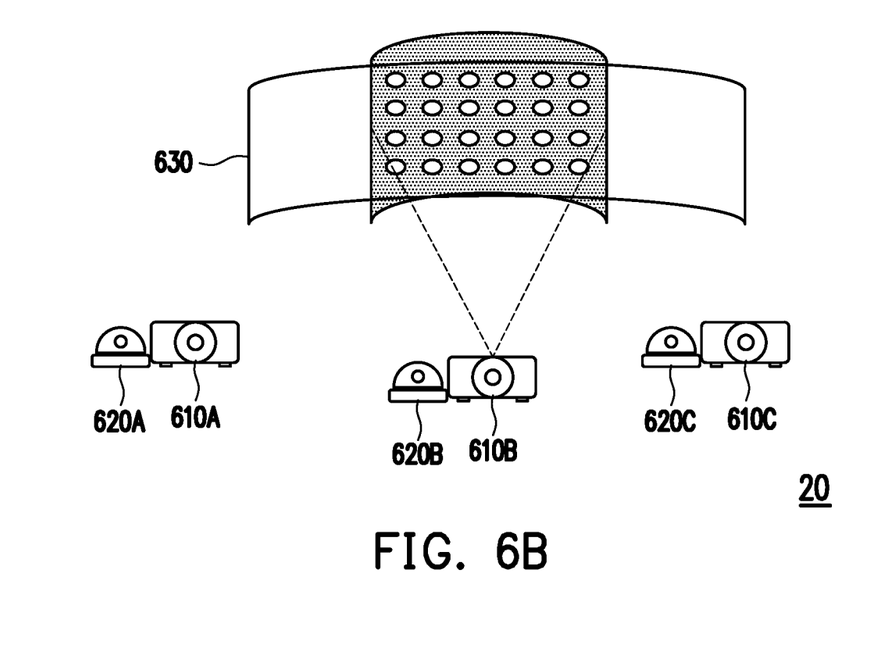
Figure 6C:
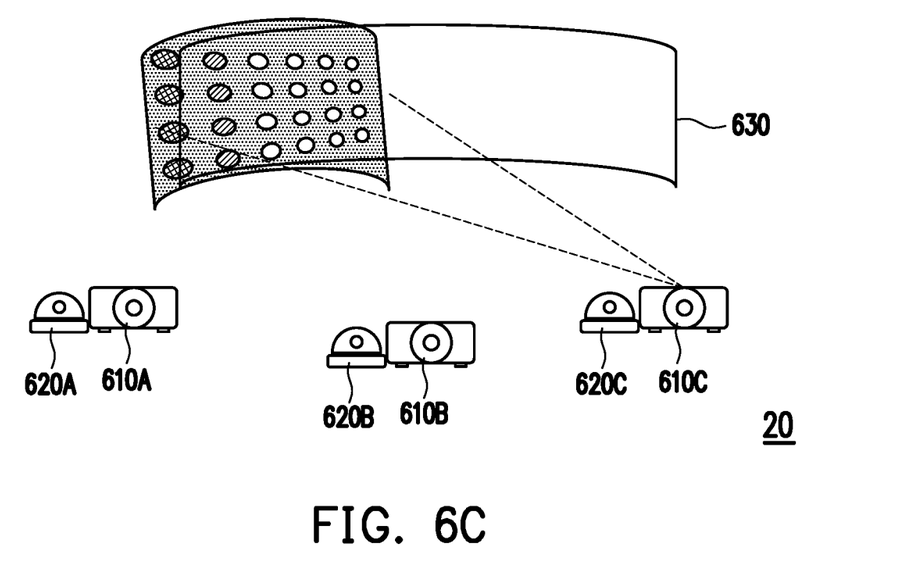

FIG. 6A, FIG. 6B, and FIG. 6C are schematic views illustrating a projection position guiding method according to an embodiment of the present disclosure. A projection system 20 is configured with a projector 610A, a projector 610B, a projector 610C, an image capturing device 620A, an image capturing device 620B, an image capturing device 620C and a projection target 630. The projector 610A, the projector 610B, and the projector 610C respectively project the projection content with the positioning grid points to the projection target 630 in FIG. 6A, FIG. 6B, and FIG. 6C to respectively generate projection images. In FIG. 6A, the projection image is located toward the right side of the projection target 630, so the positioning grid points on the right side are not completely captured, and therefore the unrecognizable grid points and the recognizable boundary grid points are shown in the projection image. In this embodiment, the projection system 20 adjusts the color of the unrecognizable grid points and the color of the boundary grid points, so that the user knows that the unrecognizable grid points are projected on the right side of the projection target 630 in FIG. 6A, thereby providing the user with adjustment instruction of projection environment. In FIG. 6B, the projection image is located in the middle of the projection target 630 so the positioning grid points are completely captured, and therefore there are no unrecognizable grid point and recognizable boundary grid point shown in the projection image. In FIG. 6C, the projection image is located toward the left side of the projection target 630, so the positioning grid points on the left side are not completely captured, and therefore the unrecognizable grid points and the recognizable boundary grid points are shown in the projection image. In this embodiment, the projection system 20 adjusts the color of the unrecognizable grid points and the color of the boundary grid points, so that the user knows that the unrecognizable grid points are projected on the left side of the projection target 630 in FIG. 6C, thereby providing the user with adjustment instruction of projection environment.

Figure 7:
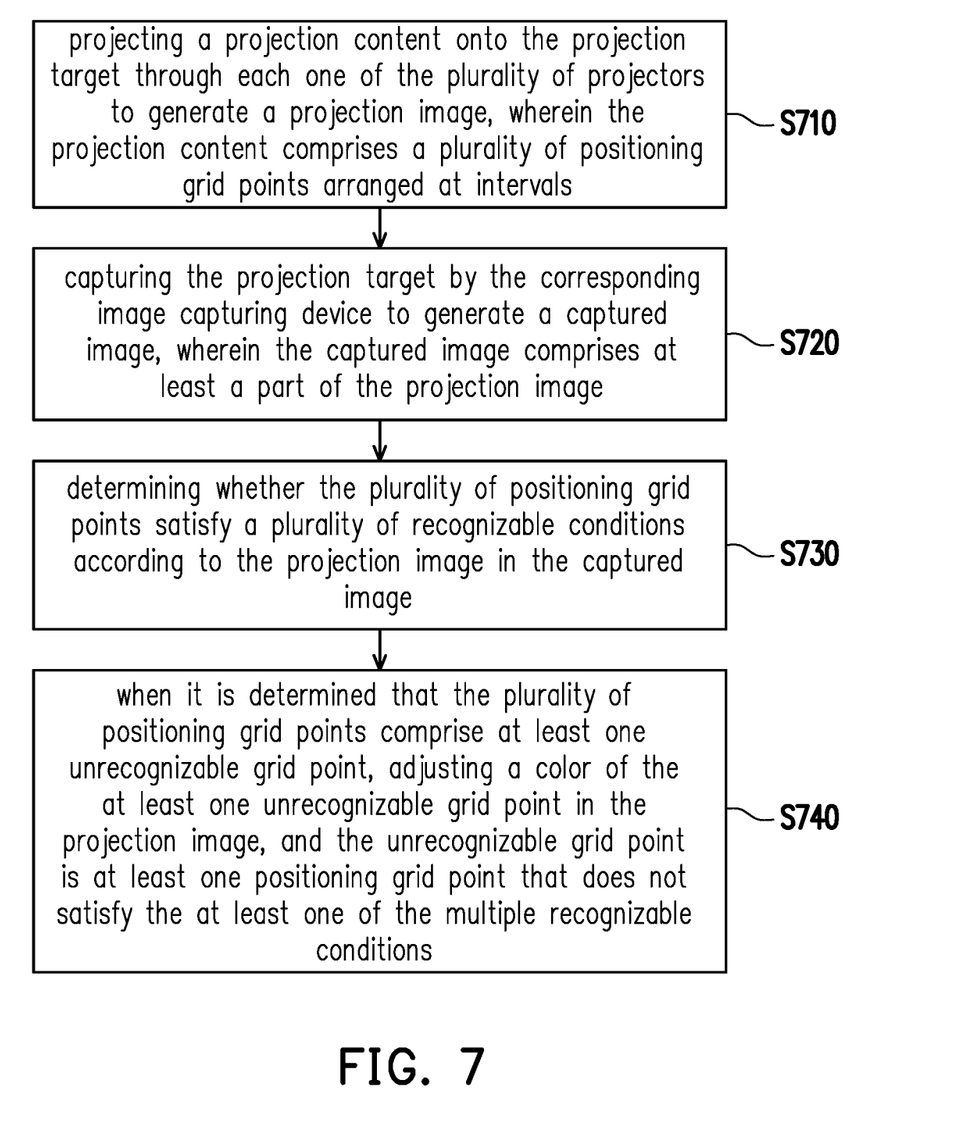
FIG. 7 is a flowchart illustrating a projection position guiding method according to an embodiment of the present disclosure.

FIG. 7 is a flowchart illustrating a projection position guiding method according to an embodiment of the present disclosure. Referring to FIG. 7, in this embodiment, the projection position guiding method is applicable to a projection system. The projection system includes a plurality of projectors, a plurality of image capturing devices and a projection target, and can be applied to the blending of a plurality of projection images. In step S710, each projector projects the projection content to the projection target to generate projection image, and the projection content includes a plurality of positioning grid points arranged at intervals. It should be noted that each of the projectors projects projection content and generates the projection image onto a partial area of the projection target, and the multiple projection images projected by the multiple projectors may be blended into a blending projection image. Next, in step S720, the corresponding image capturing device captures the projection target to generate a captured image, and the captured image includes at least part of the projection image. In step S730, the projection system determines whether the plurality of positioning grid points satisfy a plurality of recognizable conditions according to the projection image in the captured image. Next, in step S740, when the projection system determines that the plurality of positioning grid points include at least one unrecognizable grid point, the projection system adjusts the color of the at least one unrecognizable grid point in the projection content, and the at least one unrecognizable grid point is at least one of the positioning grid points that does not satisfy at least one of the plurality of recognizable conditions. For the details of FIG. 7, please refer to the related description of FIG. 2, and no further description is repeated herein.

To sum up, the embodiments of the present disclosure have at least one of the following advantages or effects. In the embodiments of the present disclosure, when it is determined that at least one of the multiple projected positioning grid points does not meet the recognizable conditions, the color of at least one unrecognizable grid point in the projection content is adjusted, so that the user may obtain the instruction for adjusting the position and direction of the image capturing device or projector from the projection image, so as to adjust the projection environment, thereby satisfying the image capturing requirement required by the projection system for performing automatic adjusting function. Therefore, there is no need to use an external device to see the adjustment instruction. In addition, the position of unrecognizable grid points can be clearly displayed to narrow the range for environment adjustment. Furthermore, before the auto blending is performed, the user may determine whether the positions or directions of the plurality of projectors and the plurality of image capturing devices need to be adjusted respectively to meet the image capturing conditions, so as to make pre-adjustment to improve the user experience.

The foregoing description of the preferred embodiments of the disclosure has been presented for purposes of illustration and description. It is not intended to be exhaustive or to limit the disclosure to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the disclosure and its best mode practical application, thereby to enable persons skilled in the art to understand the disclosure for various embodiments and with various modifications as are suited to the particular use or implementation contemplated. It is intended that the scope of the disclosure be defined by the claims appended hereto and their equivalents in which all terms are meant in their broadest reasonable sense unless otherwise indicated. Therefore, the term "the disclosure", "the present disclosure" or the like does not necessarily limit the claim scope to a specific embodiment, and the reference to particularly preferred exemplary embodiments of the disclosure does not imply a limitation on the disclosure, and no such limitation is to be inferred. The disclosure is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the disclosure. It should be appreciated that variations may be made in the embodiments described by persons skilled in the art without departing from the scope of the present disclosure as defined by the following claims. Moreover, no element and component in the present disclosure is intended to be dedicated to the public regardless of whether the element or component is explicitly recited in the following claims.

What is claimed is:

1. A projection position guiding method, adapted to a projection system, the projection system comprising a projection target, an image capturing device and a projector, and the projection position guiding method comprising:
    projecting a projection content to the projection target through the projector to generate a projection image, wherein the projection content comprises a plurality of positioning grid points arranged at intervals;
    capturing the projection target by the image capturing device to generate a captured image, wherein the captured image comprises at least a part of the projection image; and
    determining whether the plurality of positioning grid points satisfy a plurality of recognizable conditions according to the projection image in the captured image, wherein
    when it is determined that the plurality of positioning grid points comprise at least one unrecognizable grid point that does not satisfy at least one of the plurality of recognizable conditions, adjusting a color of the at least one unrecognizable grid point in the projection content,
    wherein the step of adjusting the color of the at least one unrecognizable grid point in the projection content comprises:
    adjusting the color of the at least one unrecognizable grid point in the projection content to a second color, wherein the second color is different from a first color of the plurality of positioning grid points, and
    adjusting a color of at least one boundary grid point adjacent to the at least one unrecognizable grid point in the projection content to a third color, wherein the third color is different from the first color and the second color.

2. The projection position guiding method according to claim 1, wherein before projecting the projection image to the projection target through the projector,
    the projector projects an initial projection content onto the projection target to generate an initial projection image, wherein the initial projection content comprises a plurality of initial positioning grid points arranged at intervals;
    the projection target is captured by the image capturing device to generate an initial captured image, wherein the initial captured image comprises at least a part of the initial projection image;
    it is determined whether the plurality of initial positioning grid points satisfy the plurality of recognizable conditions according to the initial projection image in the initial captured image; and when it is determined that the plurality of initial positioning grid points satisfy the plurality of recognizable conditions, the projection content is projected onto the projection target.

3. The projection position guiding method according to claim 2, wherein when it is determined that the plurality of initial positioning grid points satisfy the plurality of recognizable conditions, the step of projecting the projection content onto the projection target comprises:
converting a coordinate system of the projector and a coordinate system of the image capturing device.

4. The projection position guiding method according to claim 2, wherein the plurality of recognizable conditions comprise a resolution of the initial projection image in the initial captured image being greater than a minimum resolution, a spacing of any two adjacent positioning grid points being greater than a minimum spacing of two adjacent positioning grid points, a diameter difference between a largest positioning grid point and a smallest positioning grid point being less than a maximum distortion amount of the largest positioning grid point, a gray-scale contrast being greater than a minimum gray-scale contrast, and whether the positioning grid points are completely captured, and the step of determining whether the plurality of initial positioning grid points satisfy the plurality of recognizable conditions according to the initial projection image in the initial captured image comprises:
when the plurality of recognizable conditions are all satisfied, it is determined that the plurality of initial positioning grid points are recognizable,
when at least one of the plurality of recognizable conditions is not satisfied, it is determined that there is at least one unrecognizable initial grid point among the plurality of initial positioning grid points, and an instruction image is displayed.

5. The projection position guiding method according to claim 2, wherein the number of the plurality of initial positioning grid points of the initial projection content is less than the number of the positioning grid points of the projection content.

6. The projection position guiding method according to claim 1, wherein the plurality of recognizable conditions comprise a resolution of the projection image in the captured image being greater than a minimum resolution, a spacing between any two adjacent positioning grid points being greater than a minimum spacing between two adjacent positioning grid points, a diameter difference between a largest positioning grid point and a smallest positioning grid point being less than a maximum distortion amount of the largest positioning grid point, a gray-scale contrast being greater than a minimum gray-scale contrast, and whether the positioning grid points are completely captured, and the step of determining whether the plurality of positioning grid points satisfy the plurality of recognizable conditions according to the projection image in the captured image comprises:
when the plurality of recognizable conditions are all satisfied, it is determined that the plurality of positioning grid points are recognizable,
when at least one of the plurality of recognizable conditions is not satisfied, it is determined that the plurality of positioning grid points comprise the at least one unrecognizable grid point.

7. The projection position guiding method according to claim 1, further comprising:
comparing the projection content with the projection image in the captured image to determine whether the plurality of positioning grid points are completely captured.

8. The projection position guiding method according to claim 7, wherein when it is determined that the plurality of positioning grid points are not completely captured, the plurality of positioning grid points comprise at least one incompletely captured positioning grid point, and a color of the at least one incompletely captured positioning grid point in the projection content and a color of a positioning grid point adjacent to the at least one incompletely captured positioning grid point are adjusted, so as to generate a plurality of indicating grid points for adjusting a projection environment,
wherein the plurality of indicating grid points are configured to provide information for adjusting a position and a direction of the projector or the image capturing device or adjusting the projection environment.

9. The projection position guiding method according to claim 8, wherein a color of the plurality of indicating grid points is different from a first color of the plurality of positioning grid points.

10. The projection position guiding method according to claim 7, wherein when it is determined that the plurality of positioning grid points are not completely captured, an instruction image is projected onto the projection target by the projector, wherein the instruction image comprises a plurality of indicating grid points and a color of the plurality of indicating grid points is different from a first color of the plurality of positioning grid points, the instruction image is configured to provide information for adjusting a position and a direction of the projector or the image capturing device or adjusting the projection environment.

11. The projection position guiding method according to claim 10, wherein the instruction image is show in the projection image.

12. The projection position guiding method according to claim 1, further comprising:
adjusting a color of a border of the projection content to a fourth color.

13. A projection position guiding method, adapted to a projection system, the projection system comprising a projection target, a plurality of image capturing devices and a plurality of projectors, and the projection position guiding method comprising:
projecting a projection content to the projection target through each of the plurality of projectors to generate a projection image, wherein the projection content comprises a plurality of positioning grid points arranged at intervals;
capturing the projection target by the corresponding image capturing device to generate a captured image, wherein the captured image comprises at least a part of the projection image;
determining whether the plurality of positioning grid points satisfy a plurality of recognizable conditions according to the projection image in the captured image; and
when it is determined that the plurality of positioning grid points comprise at least one unrecognizable grid point that does not satisfy at least one of the plurality of recognizable conditions, adjusting a color of the at least one unrecognizable grid point in the projection content,
wherein the step of adjusting the color of the at least one unrecognizable grid point in the projection content comprises:

adjusting the color of the at least one unrecognizable grid point in the projection content to a second color, wherein the second color is different from a first color of the plurality of positioning grid points; and adjusting a color of at least one boundary grid point adjacent to the at least one unrecognizable grid point in the projection content to a third color, wherein the third color is different from the first color and the second color.

14. The projection position guiding method according to claim 13, wherein each of the plurality of projectors projects the projection content and generates the projection image onto a partial area of the projection target, and the projection images projected by the plurality of projectors form into a blending projection image.

15. A projection position guiding method, adapted to a projection system, the projection system comprising a projection target, an image capturing device and a projector, and the projection position guiding method comprising:

projecting a projection content to the projection target through the projector to generate a projection image, wherein the projection content comprises a plurality of positioning grid points arranged at intervals;

capturing the projection target by the image capturing device to generate a captured image, wherein the captured image comprises at least a part of the projection image; and determining whether the plurality of positioning grid points satisfy a plurality of recognizable conditions according to the projection image in the captured image, wherein when it is determined that the plurality of positioning grid points comprise at least one unrecognizable grid point that does not satisfy at least one of the plurality of recognizable conditions, adjusting a color of the at least one unrecognizable grid point in the projection content, wherein before projecting the projection image to the projection target through the projector, the projector projects an initial projection content onto the projection target to generate an initial projection image, wherein the initial projection content comprises a plurality of initial positioning grid points arranged at intervals;

the projection target is captured by the image capturing device to generate an initial captured image, wherein the initial captured image comprises at least a part of the initial projection image;

it is determined whether the plurality of initial positioning grid points satisfy the plurality of recognizable conditions according to the initial projection image in the initial captured image; and when it is determined that the plurality of initial positioning grid points satisfy the plurality of recognizable conditions, the projection content is projected onto the projection target, wherein the plurality of recognizable conditions comprise a resolution of the initial projection image in the initial captured image being greater than a minimum resolution, a spacing of any two adjacent positioning grid points being greater than a minimum spacing of two adjacent positioning grid points, a diameter difference between a largest positioning grid point and a smallest positioning grid point being less than a maximum distortion amount of the largest positioning grid point, a gray-scale contrast being greater than a minimum gray-scale contrast, and whether the positioning grid points are completely captured, and the step of determining whether the plurality of initial positioning grid points satisfy the plurality of recognizable conditions according to the initial projection image in the initial captured image comprises:

when the plurality of recognizable conditions are all satisfied, it is determined that the plurality of initial positioning grid points are recognizable, when at least one of the plurality of recognizable conditions is not satisfied, it is determined that there is at least one unrecognizable initial grid point among the plurality of initial positioning grid points, and an instruction image is displayed.

16. A projection position guiding method, adapted to a projection system, the projection system comprising a projection target, an image capturing device and a projector, and the projection position guiding method comprising:

projecting a projection content to the projection target through the projector to generate a projection image, wherein the projection content comprises a plurality of positioning grid points arranged at intervals;

capturing the projection target by the image capturing device to generate a captured image, wherein the captured image comprises at least a part of the projection image; and determining whether the plurality of positioning grid points satisfy a plurality of recognizable conditions according to the projection image in the captured image, the plurality of recognizable conditions comprise a resolution of the projection image in the captured image being greater than a minimum resolution, a spacing between any two adjacent positioning grid points being greater than a minimum spacing between two adjacent positioning grid points, a diameter difference between a largest positioning grid point and a smallest positioning grid point being less than a maximum distortion amount of the largest positioning grid point, a gray-scale contrast being greater than a minimum gray-scale contrast, and whether the positioning grid points are completely captured, and wherein the step of determining whether the plurality of positioning grid points satisfy the plurality of recognizable conditions according to the projection image in the captured image comprises:

when the plurality of recognizable conditions are all satisfied, it is determined that the plurality of positioning grid points are recognizable, when at least one of the plurality of recognizable conditions is not satisfied, it is determined that the plurality of positioning grid points comprise the at least one unrecognizable grid point, wherein when it is determined that the plurality of positioning grid points comprise at least one unrecognizable grid point that does not satisfy at least one of the plurality of recognizable conditions, adjusting a color of the at least one unrecognizable grid point in the projection content.

17. A projection position guiding method, adapted to a projection system, the projection system comprising a projection target, an image capturing device and a projector, and the projection position guiding method comprising:

projecting a projection content to the projection target through the projector to generate a projection image, wherein the projection content comprises a plurality of positioning grid points arranged at intervals;

capturing the projection target by the image capturing device to generate a captured image, wherein the captured image comprises at least a part of the projection image;

determining whether the plurality of positioning grid points satisfy a plurality of recognizable conditions according to the projection image in the captured image, and comparing the projection content with the projection image in the captured image to determine whether the plurality of positioning grid points are completely captured, wherein when it is determined that the plurality of positioning grid points comprise at least one unrecognizable grid point that does not satisfy at least one of the plurality of recognizable conditions, adjusting a color of the at least one unrecognizable grid point in the projection content, wherein when it is determined that the plurality of positioning grid points are not completely captured, the plurality of positioning grid points comprise at least one incompletely captured positioning grid point, and a color of the at least one incompletely captured positioning grid point in the projection content and a color of a positioning grid point adjacent to the at least one incompletely captured positioning grid point are adjusted, so as to generate a plurality of indicating grid points for adjusting a projection environment, wherein the plurality of indicating grid points are configured to provide information for adjusting a position and a direction of the projector or the image capturing device or adjusting the projection environment.

* * * * *